United States Patent [19]

Hastings et al.

[11] Patent Number: 4,738,770
[45] Date of Patent: Apr. 19, 1988

[54] APPARATUS AND METHOD OF REMOVAL OF CATALYST BLOCKAGE FROM REACTOR RECYCLE PUMPS

[75] Inventors: Kenneth E. Hastings, Tulsa, Okla.; Harold J. Trimble, Calgary, Canada

[73] Assignee: Cities Service Oil and Gas Corp., Tulsa, Okla.

[21] Appl. No.: 801,412

[22] Filed: Nov. 25, 1985

[51] Int. Cl.$^4$ ............ C10G 35/12; C10G 35/14; F27B 15/09

[52] U.S. Cl. .................. 208/152; 208/153; 422/140; 422/145; 422/213; 422/215; 422/219; 422/232; 406/45; 406/84; 406/96; 406/142; 406/146; 406/153; 406/197

[58] Field of Search ............ 422/140, 145, 213, 219, 422/215, 232; 55/474, 479; 406/45, 84, 96, 105, 141, 142, 145, 146, 153, 197, 198; 34/57 A; 208/152, 153

[56] References Cited

U.S. PATENT DOCUMENTS

| | | | |
|---|---|---|---|
| 3,188,286 | 6/1965 | Driesen | 422/213 |
| 3,288,567 | 11/1966 | Graham | 422/232 |
| 3,336,217 | 8/1967 | Meaux | 422/213 |
| 3,523,763 | 8/1970 | Driesen et al. | 422/140 |
| 3,698,876 | 10/1972 | Gregoli et al. | 422/215 |
| 4,221,653 | 9/1980 | Chervenak et al. | 422/140 |

FOREIGN PATENT DOCUMENTS 2286772  4/1976  France ........................ 406/153

Primary Examiner—David L. Lacey

Attorney, Agent, or Firm—John W. Carpenter

[57] ABSTRACT

A process and apparatus of preventing the plugging of the discharge and/or suction line of an internal recycle pump utilized in an expanded bed reactor of the type having a partition transversely extending through the lower portion thereof and defining a plurality of substantially regularly and uniformly disposed perforations and communicating with a reaction zone above the partition and plenum chamber therebelow. The reaction zone contains a mass of particulate catalyst contact matter supported by the partition and placed in random motion above the partition by a pressurized mixture of a liquid carbon containing material and a hydrogen rich gas flow passing through the perforations from the plenum chamber and by the internal recycle pump having a pump suction line generally concentrically disposed with respect to the reactor and extending through the partition into the reaction zone. The pump has a discharge communicating with the plenum chamber and is situated in the bottom of the reactor and has an exterior surface which extends into the atmosphere. The pump functionally recycles the liquid carbon containing material from the reaction zone through the recycle pump discharge into the plenum chamber and through the perforations in the partition. The improvement comprises extending a first catalyst withdrawal line from the pump suction line into the atmosphere to withdraw catalyst matter and prevent plugging with particulate catalyst contact matter of the recycle pump discharge and/or the suction line.

37 Claims, 1 Drawing Sheet

APPARATUS AND METHOD OF REMOVAL OF CATALYST BLOCKAGE FROM REACTOR RECYCLE PUMPS

BACKGROUND OF THE INVENTION

1. Field of the Invention

This invention is related to an improved reactor for hydrogenating a liquid carbon containing material. More specifically, this invention provides for an improved expanded bed reactor and method for preventing the plugging of the discharge and suction line of an internal recycle pump utilized in the ebullated bed reactor.

2. Description of the Prior Art

U.S. Pat. Nos. 2,885,272; 2,987,465; 3,124,518; 3,188,286; 3,266,427; 3,271,301; 3,336,217; 3,338,820; 3,354,079; 3,388,671; 3,523,888; 3,630,687; 3,698,876; 3,830,728; 3,888,761; 4,053,390; and 4,059,502 all teach either a method and/or apparatus for hydrogenating a liquid carbon containing material through a catalyst in an expanded or random motion state, as opposed from being in a fixed or fluidized state. The teachings in these U.S. Patents, as well as other prior art materials, do not present a process or a means for preventing the plugging of the discharge and/or suction line of an internal recycle pump utilized in the ebullated bed reactor of this invention. The foregoing U.S. Patents are incorporated by reference for the purposes of disclosure.

SUMMARY OF THE INVENTION

It is therefore an object of this invention to provide an economical process and means for preventing the plugging of the discharge and/or suction line of an internal recycle pump utilized in an expanded bed reactor.

It is another object of this invention to provide a method and apparatus for removing catalysts from the plenum chamber situated below the transverse partition or reactor grid of an expanded bed reactor.

Still other objects will be apparent to those skilled in the art from the following description of this invention.

The foregoing objects are achieved according to the practice of this invention. Broadly, this invention comprises an apparatus and method for preventing the plugging of the discharge and/or suction line of an internal recycle pump utilized in an expanded bed reactor of the type having a partition transversely extending through the lower portion thereof and defining a plurality of substantially regularly and uniformly disposed perforations and communicating with a reaction zone above the partition and a plenum chamber therebelow. The reaction zone contains a mass of particulate catalyst contact matter supported by the partition and placed in random motion above the partition by a pressurized mixture of a liquid carbon containing material and a hydrogen rich gas flow passing through the perforations from the plenum chamber and by the internal recycle pump having a pump suction line generally concentrically disposed with respect to the reactor and extending through the partition into the reaction zone. The pump has the discharge communicating with the plenum chamber and is situated in the bottom of the reactor and has an external surface extending into the atmosphere. The pump functionally recycles the liquid carbon containing material from the reaction zone through the internal recycle pump discharge into the plenum chamber and through the perforations in the partition. The improvement comprises extending a first catalyst withdrawal line from the pump suction line into the atmosphere to withdraw catalyst matter and prevent plugging with particulate catalyst contact matter of the recycle pump discharge and/or the suction line.

These, together with various ancillary objects and features which will become apparent to those artisans possessing ordinary skill in the art and as the following description proceeds, are attained by this novel apparatus and method, a preferred embodiment shown in the accompanying drawings, by way of example only wherein:

DETAILED DESCRIPTION OF THE INVENTION

Figure 1:
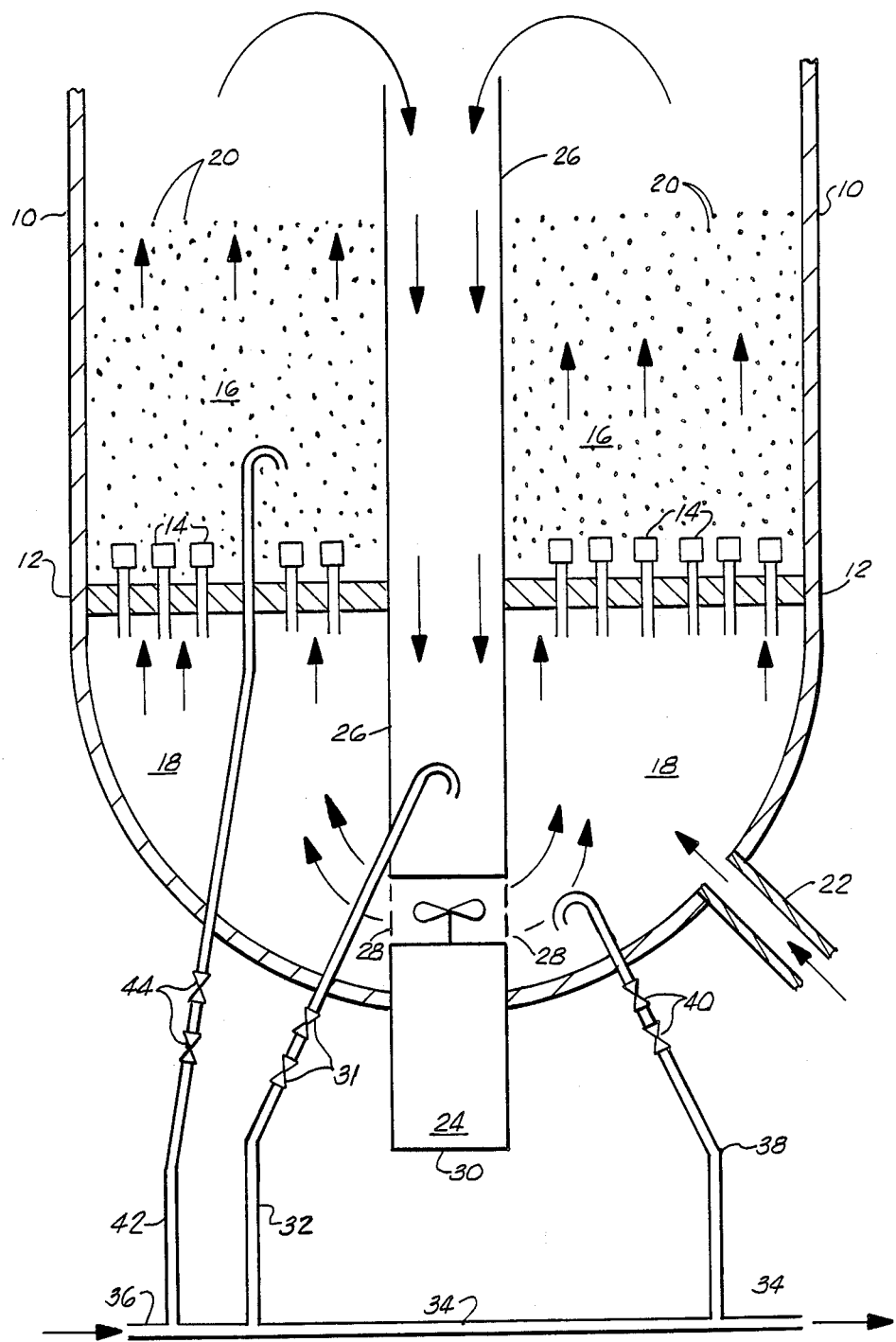
FIG. 1 is a partial schematic diagram of an ebullated bed reactor illustrating a catalyst withdrawal line from the internal recycle pump suction line, from the bottom of the plenum chamber, and from close proximity to the transverse partition or reactor grid in the bottom of the reactor.

Referring in detail now to the drawing wherein similar parts of the invention are identified by like reference numerals, there is seen an expanded bed reactor, generally illustrated as 10, of the type having a partition 12 transversely extending through the lower portion thereof and defining a plurality of substantially regularly and uniformly disposed perforations extending through the partition 12 and having bubble caps 14 disposed therein communicating with a reaction zone, generally illustrated as 16, and a plenum chamber, generally illustrated as 18, therebelow. The reaction zone 16 contains a mass of particulate catalyst contact matter 20 supported by the partition 12 and placed in random motion above said partition 12 by a pressurized mixture of a liquid carbon containing material and a hydrogen rich gas flow entering the plenum chamber 18 via conduit 22 and passing through the bubble caps 14 from the plenum chamber 18. An internal recycle pump means, generally illustrated as 24, assist in random motioning the catalyst contact matter 20 and includes a pump suction line means 26 having a lower suction line portion with suction line sides and generally concentrically disposed with respect to the reactor 10 and extending through the partition 12 into the reaction zone 16. The pump means 24 has a discharge outlet 28 communicating with the plenum chamber 18 and is situated in the bottom of the reactor 10 and has an external surface 30 extending into the atmosphere. The pump means 24 functionally recycles the liquid carbon containing material from the reaction zone 16 through the suction line means 26, through the discharge outlet 28 into the plenum chamber 18 and subsequently up through the bubble caps 14 in the partition 12. A catalyst withdrawal line 32 having valves 31—31 and an end defining a loop extends from the pump suction line means 26 to a catalyst line 34 which leads to a catalyst withdrawal vessel (not shown in drawing) and functions to withdraw the catalyst matter 20 from the suction line means 26. As illustrated in the drawing, catalyst withdrawal line 32 is in flow communication with the lower suction line portion of the pump suction line means 26 and extends through the suction line sides of the lower suction line portion to the catalyst line 34. Carrier oil from a carrier oil line 36 is the transport medium for the catalytic matter 20. Another catalyst withdrawal line 38 with valves 40—40, and also including an end defining a loop, extends from the bottom of the plenum chamber 18 to catalyst line 34 to withdraw catalytic matter 20 in proximity to the bottom of the plenum chamber 18. A conventional catalyst withdrawal line 42 including valves 44—44 positioned therein, as illustrated, can remove catalyst from the top of partition 12 to the catalyst line 34.

With continuing reference to the drawing for operation of the invention, the catalyst matter 20 within the reactor 10 is usually ebullated or expanded by the pressurized flow of liquid carbon containing matter- hydrogen gas rich feed from conduit 22, and by the recycle flow of the liquid carbon containing material (including some hydrogen rich gas) from the reaction zone 16. Operating mistakes or unit upsets during emergencies on occasion have caused catalytic matter 20 to be carried over into the suction line means 26 and in the plenum chamber 18 below the partition 12 at the recycle pump means discharge outlet 28. In the past, plugging of the recycle pump means discharge outlet 28 and/or suction line means 26 with catalytic matter 20 has forced the process to be shut down for a period of time in order to remove the recycle pump means 24 from the bottom of the reactor 10 to withdraw obstructing catalytic matter 20. We have discovered that by extending the catalyst withdrawal line 32 from the pump suction line means 26 and the catalyst withdrawal line 38 from the bottom of the plenum chamber 18 to the catalyst line 34, loss of operating time in the event of catalytic matter 20 carry over will be minimized. In the event of suspicion (or actual) of catalytic matter 20 carry over, valves 31—31 and valves 40—40 can be temporarily opened and the pressure differential between the inside of the reactor 10 and the catalyst line 34 will cause any catalytic matter 20 carry over to be conveyed into the catalyst line 34. Catalyst withdrawal line 38 can be purged with gas as described in U.S. Pat. No. 3,336,217. In a preferred embodiment of the invention, purging of the withdrawal line 32 from the pump suction line means 26 is by either a liquid carbon containing material or a gaseous matter (or combination of the two) to prevent disrupting of the recycle pump means 24 ability to function as designed. The catalyst withdrawal line 32 will preferably be installed through a nozzle (not shown in the drawing) and the bottom head of the reactor 10. In another embodiment of the invention, catalyst withdrawal line 32 may be installed through a hole drilled through the body of the external surface 30 of the recycle pump means 24 to obviate the necessity of having the catalyst withdrawal line 32 extending within the inside of the plenum chamber 18; this embodiment creates less obstruction of the inside of the plenum chamber and facilitates the repair of the catalyst withdrawal line 32 should the same be needed.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. An improved expanded or ebullated bed reactor having a partition that transversely extends through a lower portion thereof and the partition has a plurality of substantially regularly and uniformly disposed perforations that communicate with a reaction zone positioned above the partition and a plenum chamber having a plenum chamber inlet and situated below the partition, said reaction zone containing a mass of particulate catalyst matter supported by said partition and placed in random motion above said partition by a pressurized mixture of liquid carbon containing material and a hydrogen rich gas flow passing through the plenum chamber inlet and into the plenum chamber and through the perforations from the plenum chamber and by an internal recycle pump means having a pump suction line means with a lower suction line portion and generally concentrically disposed with respect to the reactor and extending through the partition into the reaction zone, said pump means has a recycle pump discharge outlet communicating with the plenum chamber and is situated in the bottom of said reactor and has an exterior surface which extends into the atmosphere, and said pump means functionally recycles the liquid carbon containing material from the reaction zone through the pump suction line means and through the recycle pump discharge outlet into the plenum chamber and through the perforations in the partition, wherein the improvement comprises a first catalyst withdrawal line in flow communication with the lower suction line portion of the pump suction line means and extending from the pump suction line means through the bottom of the reactor and to a withdrawal line means in order to withdraw catalyst matter from the pump suction line means to the withdrawal line means.

2. The improved expanded or ebullated bed reactor of claim 1 wherein said first catalyst withdrawal line extends from the inside of said pump suction line means through the plenum chamber and the bottom of the reactor and to said withdrawal line means.

3. The improved expanded or ebullated bed reactor of claim 2 wherein said first catalyst withdrawal line includes an end that terminates inside of said pump suction line means, said end of said first withdrawal line has a structure defining a loop means.

4. The improved expanded or ebullated bed reactor of claim 2 wherein said first catalyst withdrawal line includes at least one valve means for regulating the flow of catalyst matter from the pump suction line means to the withdrawal line means.

5. The improved expanded or ebullated bed reactor of claim 4 wherein said at least one valve means comprises a pair of valve means for regulating the flow of catalyst matter from the pump suction line means to the withdrawal line means.

6. The improved expanded or ebullated bed reactor of claim 2 additionally comprising a second withdrawal line extending from the plenum chamber through the bottom of the reactor and to the withdrawal line means.

7. The improved expanded or ebullated bed reactor of claim 6 wherein said second catalyst withdrawal line includes an end that terminates inside of said plenum chamber, said end of said second withdrawal line has a structure defining a loop means.

8. The improved expanded or ebullated bed reactor of claim 6 wherein said second catalyst withdrawal line includes at least one valve means for regulating the flow of catalyst matter from the plenum chamber to the withdrawal line means.

9. The improved expanded or ebullated bed reactor of claim 8 wherein said at least one valve means includes a pair of valve means for regulating the flow of catalyst matter from the plenum chamber to the withdrawal line means.

10. The improved expanded or ebullated bed reactor of claim 1 additionally comprising a second withdrawal line extending from the plenum chamber through the bottom of the reactor and to the withdrawal line means.

11. The improved expanded or ebullated bed reactor of claim 10 wherein said second catalyst withdrawal line includes an end that terminates inside of said plenum chamber, said end of said second withdrawal line has a structure defining a loop means.

12. The improved expanded or ebullated bed reactor of claim 10 wherein said second catalyst withdrawal line includes at least one valve means for regulating the flow of catalyst matter from the plenum chamber to the withdrawal line means.

13. The improved expanded or ebullated bed reactor of claim 12 wherein said at least one valve means includes a pair of valve means for regulating the flow of catalyst matter from the plenum chamber to the withdrawal line means.

14. The improved expanded or ebullated bed reactor of claim 1 additionally comprising a second withdrawal line that extends from the reaction zone above the partition, through the partition and the plenum chamber, and through the bottom of the reactor and to the withdrawal line means.

15. The improved expanded or ebullated bed reactor of claim 14 wherein said second withdrawal line includes an end that terminates in said reaction zone, said end of said second withdrawal line has a structure defining a loop means.

16. The improved expanded or ebullated bed reactor of claim 14 wherein said second withdrawal line includes at least one valve means for regulating the flow of catalyst matter from the reaction zone to the withdrawal line means.

17. The improved expanded or ebullated bed reactor of claim 1 wherein said pump suction line means comprises suction line sides, and said first catalyst withdrawal line extends through said suction line sides.

18. The improved expanded or ebullated bed reactor of claim 17 wherein said first catalyst withdrawal line extends through said suction line sides in the lower portion of the reactor below said partition.

19. An improved expanded or ebullated bed reactor having a partition that transversely extends through a lower portion thereof and the partition has a plurality of substantially regularly and uniformly disposed perforations that communicate with a reaction zone positioned above the partition and a plenum chamber having a plenum chamber inlet end situated below the partition, said reaction zone containing a mass of particulate catalyst matter supported by said partition and placed in random motion above said partition by a pressurized mixture of a liquid carbon containing material and a hydrogen rich gas flow passing through the plenum chamber inlet and into the plenum chamber and through the perforations from the plenum chamber and by an internal recycle pump means having a pump suction line means generally concentrically disposed with respect to the reactor and extending through the partition into the reaction zone, said pump means has a recycle pump discharge outlet communicating with the plenum chamber and is situated in the bottom of said reactor and has an exterior surface which extends into the atmosphere, and said pump means functionally recycles the liquid carbon containing material from the reaction zone through the pump suction line means and through the recycle pump discharge outlet into the plenum chamber and through the perforations in the partition, wherein the improvement comprises a first catalyst withdrawal line extending from the inside of said pump suction line means through the plenum chamber and the bottom of the reactor and to a withdrawal line means in order to withdraw catalyst matter from the pump suction line means to the withdrawal line means, said first catalyst withdrawal line includes an end that terminates inside of said pump suction line means; and a second withdrawal line extending from the plenum chamber through the bottom of the reactor and to the withdrawal line means, said second catalyst withdrawal line includes an end that terminates inside of said plenum chamber.

20. The improved expanded or ebullated bed reactor of claim 19 wherein said end of said first withdrawal line has a structure defining a loop means, and said end of said second withdrawal line has a structure defining a loop means.

21. The improved expanded or ebullated bed reactor of claim 19 wherein said first catalyst withdrawal line includes at least one valve means for regulating the flow of catalyst matter from the pump suction line means to the withdrawal line means, and said second catalyst withdrawal line includes at least one valve means for regulating the flow of catalyst matter from the plenum chamber to the withdrawal line means.

22. The improved expanded or ebullated bed reactor of claim 19 additionally comprising a third withdrawal line that extends from the reaction zone above the partition, through the partition and the plenum chamber, and through the bottom of the reactor and to the withdrawal line means.

23. The improved expanded or ebullated bed reactor of claim 22 wherein said third withdrawal line includes an end that terminates in said reaction zone, said end of said third withdrawal line has a structure defining a loop means.

24. The improved expanded or ebullated bed reactor of claim 23 wherein said third withdrawal line includes at least one valve means for regulating the flow of catalyst matter from the reaction zone to the withdrawal line means.

25. The improved expanded or ebullated bed reactor of claim 19 wherein said pump suction line means comprises suction line sides, and said first catalyst withdrawal line extends through said suction line sides in the lower portion of the reactor below said partition.

26. An improved process for preventing the plugging with particulate catalyst matter of a suction line means and/or a discharge outlet of an internal recycle pump means in an expanded or ebullated bed reactor having a partition that transversely extends through a lower portion thereof and the partition has a plurality of substantially regularly and uniformly disposed perforations extending through the partition and communicating with a reaction zone above the partition and a plenum chamber therebelow, having a plenum chamber inlet and a mass of particulate catalyst matter, said reaction zone containing a mass of particulate catalyst matter supported by said partition and placed in random motion above said partition by a pressurized mixture of a liquid carbon containing material and a hydrogen rich gas flow passing through the plenum chamber inlet and into the plenum chamber and through the perforations from the plenum chamber and by said internal recycle pump means having a pump suction line means containing a mass of particulate catalyst matter and generally concentrically disposed with respect to the reactor and extending through the partition into the reaction zone, said pump means has a recycle pump discharge outlet communicating with the plenum chamber and is situated in the bottom of said reactor and has an exterior surface extending into the atmosphere, and said pump means functionally recycles the liquid carbon containing material from the reaction zone through the pump suction line means and through the discharge outlet into the plenum chamber and upwardly through the perforations in the partition, wherein the improvement comprises withdrawing said particulate catalyst matter from said pump suction line means.

27. The improved process of claim 26 wherein said withdrawing is through a first catalyst withdrawal line that extends from said pump suction line means through the plenum chamber and through the bottom of the reactor and to the withdrawal line means, said first catalyst withdrawal line has an end that terminates inside said pump suction line means and defines a loop means.

28. The improved process of claim 27 additionally comprising purging said first catalyst withdrawal line after said withdrawing step.

29. The improved process of claim 26 additionally comprising withdrawing said particulate catalyst matter from the plenum chamber through the bottom of the reactor and to the withdrawal line means.

30. The improved process of claim 29 wherein said withdrawing from said plenum chamber is through a second catalyst withdrawal line that extends from the plenum chamber through the bottom of the reactor and to the withdrawal line means, said second catalyst withdrawal line has an end that terminates inside said plenum chamber and defines a loop means.

31. The improved process of claim 30 additionally comprising purging said second catalyst withdrawal line after said withdrawing from said plenum chamber.

32. The improved process of claim 26 wherein said pump suction line means comprises suction line sides, and said withdrawing catalyst matter from said pump suction line means is through said suction line sides below said partition.

33. An improved process for preventing the plugging with particulate catalyst matter of a suction line means and/or a discharge outlet of an internal recycle pump means in an expanded or ebullated bed reactor having a partition that transversely extends through a lower portion thereof and the partition has a plurality of substantially regularly and uniformly disposed perforations extending through the partition and communicating with a reaction zone above the partition and a plenum chamber therebelow, having a plenum chamber inlet and a mass of particulate catalyst matter, said reaction zone containing a mass of particulate catalyst matter supported by said partition and placed in random motion above said partition by a pressurized mixture of a liquid carbon containing material and a hydrogen rich gas flow passing through the plenum chamber inlet and into the plenum chamber and through the perforations from the plenum chamber and by said internal recycle pump means having a pump suction line means containing a mass of particulate catalyst matter and generally concentrically disposed with respect to the reactor and extending through the partition into the reaction zone, said pump means has a recycle pump discharge outlet communicating with the plenum chamber and is situated in the bottom of said reactor and has an exterior surface extending into the atmosphere, and said pump means functionally recycles the liquid carbon containing material from the reaction zone through the pump suction line means and through the discharge outlet into the plenum chamber and upwardly through the perforations in the partition, wherein the improvement comprises:

(a) withdrawing said particulate catalyst matter from said pump suction line means through the bottom of said reactor and to a withdrawal line means to prevent said plugging with said particulate catalyst matter of the discharge outlet or the suction line means, said withdrawing is through a first catalyst withdrawal line that extends from said pump suction line means through the plenum chamber and through the bottom of the reactor and to the withdrawal line means, said first catalyst withdrawal line has an end that terminates inside said pump suction line means and defines a loop means;

(b) withdrawing said particulate catalyst contact matter from the plenum chamber through the bottom of the reactor and to the withdrawal line means, said withdrawing from said plenum chamber is through a second catalyst withdrawal line that extends from the plenum chamber through the bottom of the reactor and to the withdrawal line means, said second catalyst withdrawal line has an end that terminates inside said plenum chamber and defines a loop means; and (c) purging said first and second catalyst withdrawal lines after withdrawing catalyst matter through each of said first and second withdrawal lines.

34. The improved process of claim 33 wherein said pump suction line means comprises suction line sides, and said withdrawing catalyst matter from said pump suction line means is through said suction line sides below said partition.

35. An improved expanded or ebullated bed reactor having a partition that transversely extends through a lower portion thereof and the partition has a plurality of substantially regularly and uniformly disposed perforations that communicate with a reaction zone positioned above the partition and a plenum chamber having a plenum chamber inlet and situated below the partition, said reaction zone containing a mass of particulate catalyst matter supported by said partition and placed in random motion above said partition by a pressurized mixture of liquid carbon containing material and a hydrogen rich gas flow passing through the plenum chamber inlet and into the plenum chamber and through the perforations from the plenum chamber and by an internal recycle pump means having a pump suction line means including a lower suction line portion with suction line sides and generally concentrically disposed with respect to the reactor and extending through the partition into the reaction zone, said pump means has a recycle pump discharge outlet communicating with the plenum chamber and is situated in the bottom of said reactor and has an exterior surface which extends into the atmosphere, and said pump means functionally recycles the liquid carbon containing material from the reaction zone through the pump suction line means and through the recycle pump discharge outlet into the plenum chamber and through the perforations in the partition, wherein the improvement comprises a first catalyst withdrawal line in flow communication with the lower suction line portion of the pump suction line means and extending through the suction line sides to a withdrawal line means in order to withdraw catalyst matter from the pump suction line means to the withdrawal line means.

36. An improved process for preventing the plugging with particulate catalyst matter of a suction line means and/or a discharge outlet of an internal recycle pump means in an expanded or ebullated bed reactor having a partition that transversely extends through a lower portion thereof and the partition has a plurality of substantially regularly and uniformly disposed perforations extending through the partition and communicating with a reaction zone above the partition and a plenum chamber therebelow, having a plenum chambaer inlet, said reaction zone containing a mass of particulate catalyst matter supported by said partition and placed in random motion above said partition by a pressurized mixture of a liquid carbon containing material and a hydrogen rich gas flow passing through the plenum chamber inlet and into the plenum chamber and through the perforations from the plenum chamber and by said internal recycle pump means having a pump suction line means including a lower suction line portion with suction line sides and containing catalytic matter and generally concentrically disposed with respect to the reactor and extending through the partition into the reaction zone, said pump means has a discharge outlet communicating with the plenum chamber and is situated in the bottom of said reactor and has an exterior surface extending into the atmosphere, and said pump means functionally recycles the liquid carbon containing material from the reaction zone through the pump suction line means and through the discharge outlet into the plenum chamber and upwardly through the perforations in the partition, wherein the improvement comprises withdrawing said catalytic matter from the lower suction line portion of said pump suction line means to a withdrawal line means.

37. The improved process of claim 36 wherein said withdrawing of said catalytic matter is through the suction line sides of the pump suction line means.

* * * * *